United States Patent [19]

Hope et al.

[11] 4,050,298

[45] Sept. 27, 1977

[54] MANUALLY OPERATED CONTROL VALVE AND TESTING APPARATUS INCORPORATING SUCH VALVE

[75] Inventors: Frederick John Charles Hope, Chobham; James Malcolm Pigney, Bracknell, both of England

[73] Assignee: Hope Technical Developments Limited, Ascot, England

[21] Appl. No.: 684,823

[22] Filed: May 10, 1976

[30] Foreign Application Priority Data

May 8, 1975 United Kingdom ............... 19506/75
Aug. 29, 1975 United Kingdom ............... 35759/75

[51] Int. Cl.² .............................................. G01L 5/28
[52] U.S. Cl. ..................................... 73/121; 137/505
[58] Field of Search .................. 73/121, 168; 251/205; 137/505, 505.14, 505.24; 254/93 R

[56] References Cited

U.S. PATENT DOCUMENTS

| | | | |
|---|---|---|---|
| 2,501,483 | 3/1950 | Taylor | 137/505 X |
| 3,937,074 | 2/1976 | Burkett | 73/121 |
| 3,958,454 | 5/1976 | Rasch | 73/121 |

Primary Examiner—Jerry W. Myracle
Attorney, Agent, or Firm—Sughrue, Rothwell, Mion, Zinn and Macpeak

[57] ABSTRACT

Disclosed herein is a manually operated control valve wherein a pressure regulating valve and exhaust valve are contained in the same housing with intercommunicating passages, both valves having actuating plungers which are operated by a single manual operating means, such as a lever. The invention includes apparatus for testing vehicle pneumatic braking systems wherein the manually operated control valve is used in conjunction with a pressure gauge to test the system by controlling the supply and exhaust of air to and from the vehicle braking system and observing accompanying variations in pressure.

9 Claims, 6 Drawing Figures

MANUALLY OPERATED CONTROL VALVE AND TESTING APPARATUS INCORPORATING SUCH VALVE

BACKGROUND OF THE INVENTION

Fluid operated systems are widely used in which a working fluid is supplied to a closed system so as to move it from one state to a second state and which, on exhausting the fluid, returns to its initial state. Examples of such systems are hydraulically and pneumatically-operated rams and jacks. Conventionally, separate supply and exhaust valves, i.e. valves having separate housings and operating means are provided to control the supply and exhaust of fluid to and from the system. The present invention essentially provides a control valve in which both functions are incorporated in a single housing and a single manual operating means is arranged to operate both the supply and exhaust functions of the valve.

SUMMARY OF THE INVENTION

According to the present invention there is provided a manually-operated control valve for controlling the supply and exhaust of a working fluid to and from a fluid operable system which comprises a housing having a inlet for the working fluid and an outlet for delivering working fluid to the system, a pressure-regulating valve disposed between said inlet and said outlet and an exhaust valve for exhausting fluid from the system, said regulating valve and said exhaust valve each being actuable by plungers operable by a single manual operating means.

Conveniently the manual operating means comprises a lever, wheel or similar hand operated device and includes cam surfaces for contacting the plungers.

The control valve preferably also includes within its housing a non-return valve disposed between the pressure-regulating valve and the outlet to the system.

Control valves in accordance with the invention are particularly suitable for incorporation in test rigs used for testing pneumatic braking systems of road vehicles, e.g. the trailer of an articulated vehicle.

In such a test rig, the inlet to the valve would be connected to a source of compressed air and the outlet to the pneumatic braking system of the vehicle. By operation of the pressure regulating valve of the control valve, the vehicle pneumatic system can be pressurized to any desired pressure and the behaviour of the system then observed. The exhaust of air from the vehicle system can then be effected by operation of the actuating plunger of the exhaust valve incorporated in the valve of the present invention. Modern articulated vehicles are provided with three pneumatic circuits which are conventionally termed the 'service line', the 'emergency line', and the 'auxiliary line'. It has been found that two control valves in accordance with the invention are adequate for controlling all the functions of a test rig for the pneumatic braking system of an articulated vehicle whereas conventional test rigs have necessitated the use of many more separately operable valves.

The invention includes a test rig of the kind described above which incorporates control valves in accordance with the invention.

BRIEF DESCRIPTION OF THE DRAWINGS

The invention is illustrated with reference to the accompanying drawings in which.

DETAILS OF THE INVENTION

Figure 1:
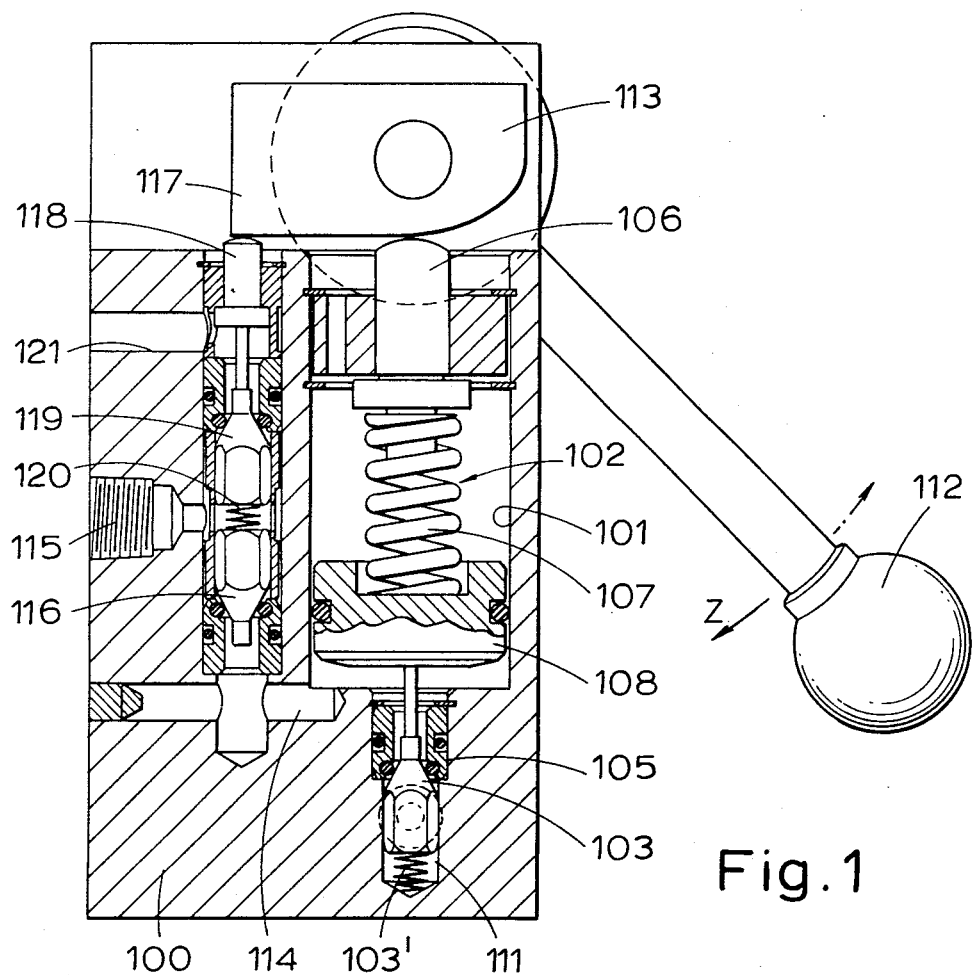
FIG. 1 is a sectional elevation of a control valve in accordance with the invention.
Figure 2:
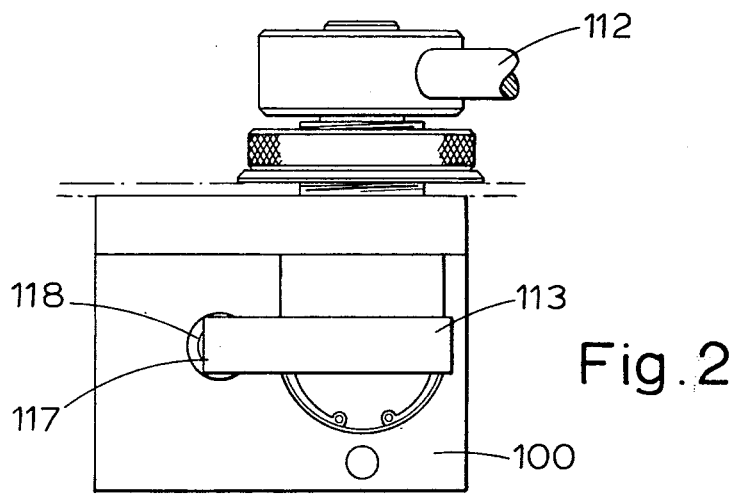
FIG. 2 is a part plan view of the top of the valve shown in FIG. 1.

Referring to the drawings and in particular to FIG. 1, the control valve comprises a housing 100 having a first bore 101 for accommodating the actuating mechanism 102 of the regulating valve. The regulating valve includes a closure member 103 which is spring biased by a spring 103' into a normally closed position against a valve seat 104 which includes a sealing ring 105. Actuation of the closure member 103 of the regulating valve is effected by downward movement of a plunger 106 which is connected to the closure member 103 by a pressure regulator spring 107, a piston member 108 and a connecting rod 109. A supply of compressed air is fed from a source not shown via an inlet 110 and 110' to a chamber 111 beneath the closure member 103. Downward movement of the plunger 106 and hence opening of the pressure regulating valve is effected by movement of the lever 112 in the direction indicated by the arrow Z in FIG. 1. It will be seen that cam 113 is provided with cam surfaces which are shaped such that movement of the lever 112 in the direction of the arrow Z causes depression of the plunger 106 and hence opening of the pressure regulating valve. On opening the pressure regulating valve, compressed air flows from chamber 111 through conduit 114 and out of the control valve through outlet 115 via a non-return valve 116. As will be described subsequently in relation to FIGS. 3 to 5, outlet 115 is adapted to be connected to one of the pneumatic circuits of a road vehicle. When compressed air has been fed to the pneumatic system to the desired extent, lever 112 is returned to the position shown in FIG. 1 so that the regulating valve closes under the action of the spring 103' acting on the closure member 103. When it is desired to exhaust the pneumatic system, lever 112 is moved in the opposite direction to that indicated by arrow Z, which causes an extension 117 of the cam 113 to depress a plunger 118. Plunger 118 is connected to the closure member 119 of an exhaust valve which is normally spring biased into a closed position by means of a spring 120 disposed between the closure member 119 and the non-return valve 116. Depression of the plunger 118 and consequential opening of the valve 119 allows air to flow from the pneumatic system back through the outlet 115 and to atmosphere through the exhaust outlet 121.

Figure 3:
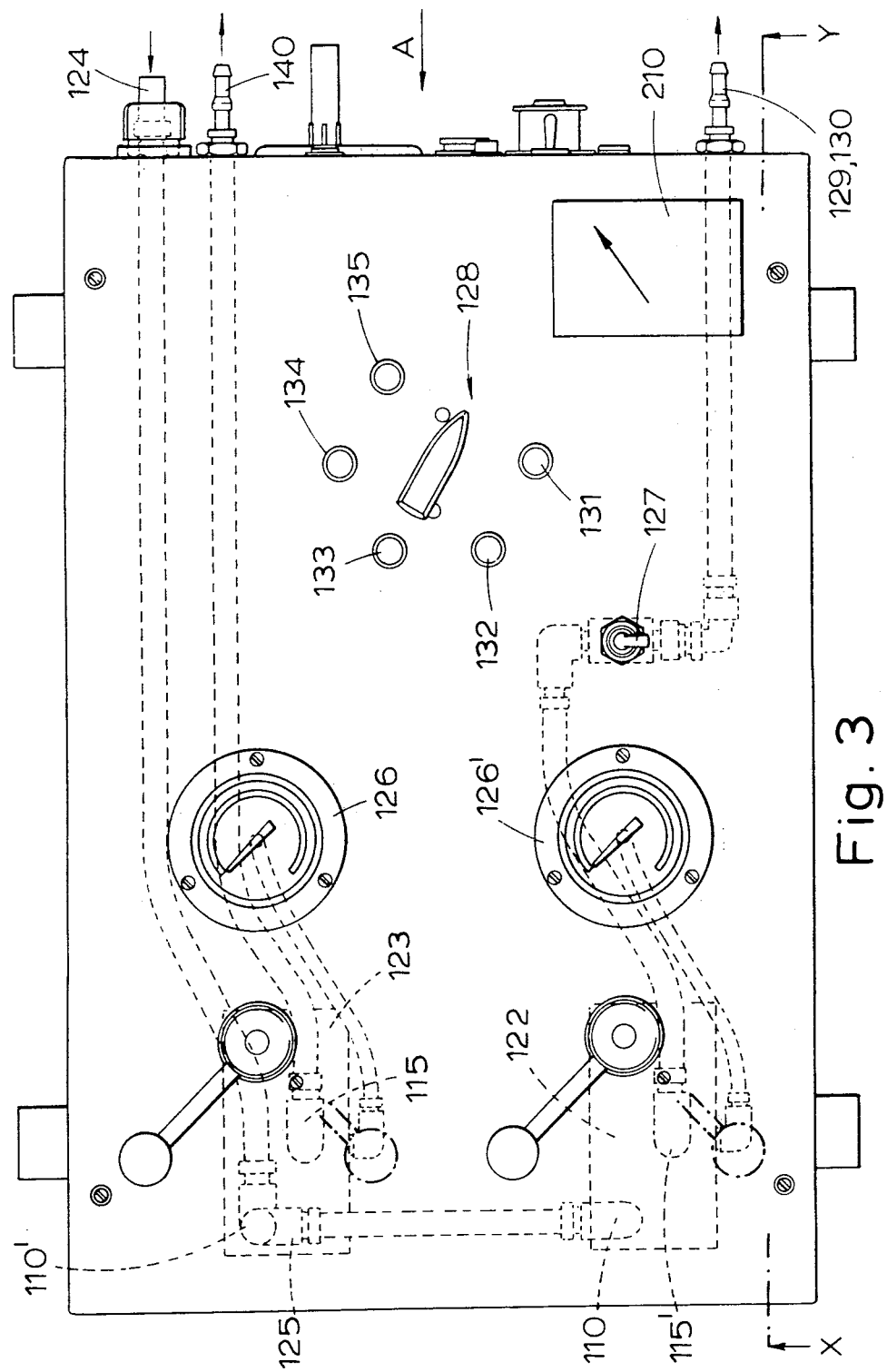
FIG. 3 is a plan view of a test rig for pneumatic systems of a road vehicle showing in broken lines the major components contained within the casing of the rig.
Figure 4:
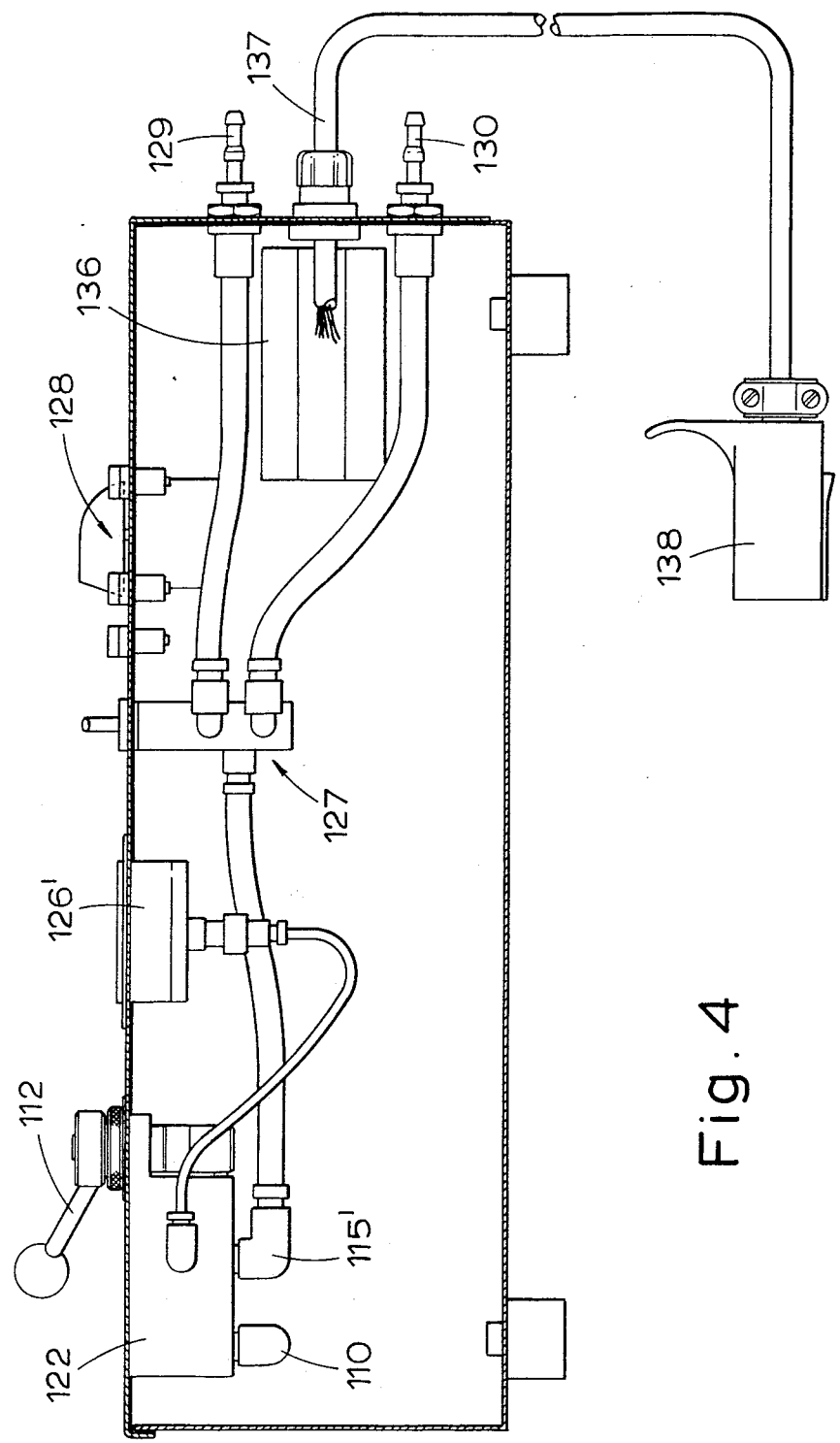
FIG. 4 is a section taken on the line X-Y in FIG. 3.
Figure 5:
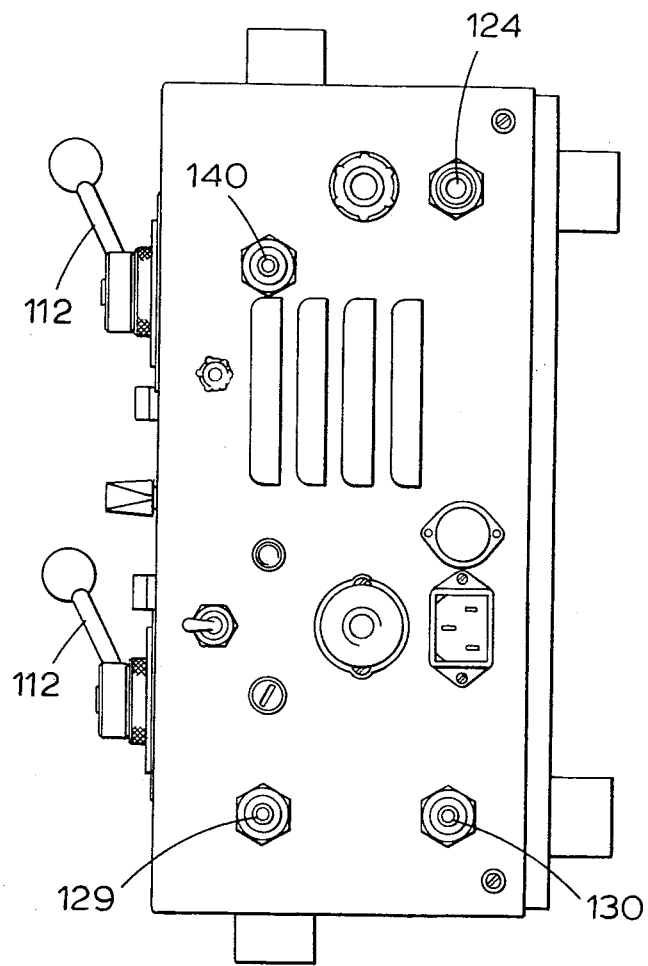
FIG. 5 is a plan view of one end of the test rig seen in the direction shown by arrow A in FIG. 3.

Referring to FIGS. 3 to 5 of the drawings, it will be seen that two control valves as generally indicated at 122 and 123 are mounted in a casing of the test rig together with their associated components. A connector for the supply of compressed air to the test rig is provided on an end panel of the casing at 124 (see FIGS. 4 and 5) and connector 124 is arranged to communicate via suitable tubing (shown in chain dotted lines) to inlet 110' of valve 123. Inlet 110' includes a branch connector 125 for supplying air to the second valve 122. Valves 122 and 123 include outlets 115 and 115' for supplying air to one of the pneumatic circuits of a road vehicle for testing purposes. In the arrangement illustrated, valve 123 is intended to supply air to the emergency line of the vehicle while valve 122 is intended to supply air to the service and auxiliary lines. The outlets 115 and 115' are connected by branch connectors to pressure gauges 126 and 126' for measuring the pressures in the pneumatic circuits under test. Valve 123 is connected via pressure gauge 126 to an outlet 140 located in an end panel of the casing.

Air may be supplied by the valve 122 to either the service or auxiliary lines depending upon the position of a toggle valve 127 which, in one position supplies air from valve 122 to an outlet 129 for the service line and, in its other position supplies air from valve 122 to an outlet 130 for the auxiliary line.

The test rig includes a rotary switch 128 for supplying electric current to the various electrical circuits of the vehicle and indicator lights 131 to 135 for each circuit to give an indication of any fault in one of the electrical circuits of the vehicle. Power for the electrical test unit is supplied by a transformer 136 which is connected to an electrical main supply by a cable (not shown). Rotary switch 128 is connected to the electrical system of the vehicle or trailer by means of lead 137 and a connector 138. It will be appreciated that rotary switch 128 enables each circuit in turn of the vehicle to be connected to the power output from transformer 136 and an indicator light 131 to 135. Failure of an indicator light to glow will indicate a fault in the circuit being examined. The indicators 131 to 135 may be replaced or supplemented with an ammeter which may be calibrated in amperes or in number of lighting bulbs and the reading will thus indicate whether one or more bulbs in the circuit have blown.

Figure 6:
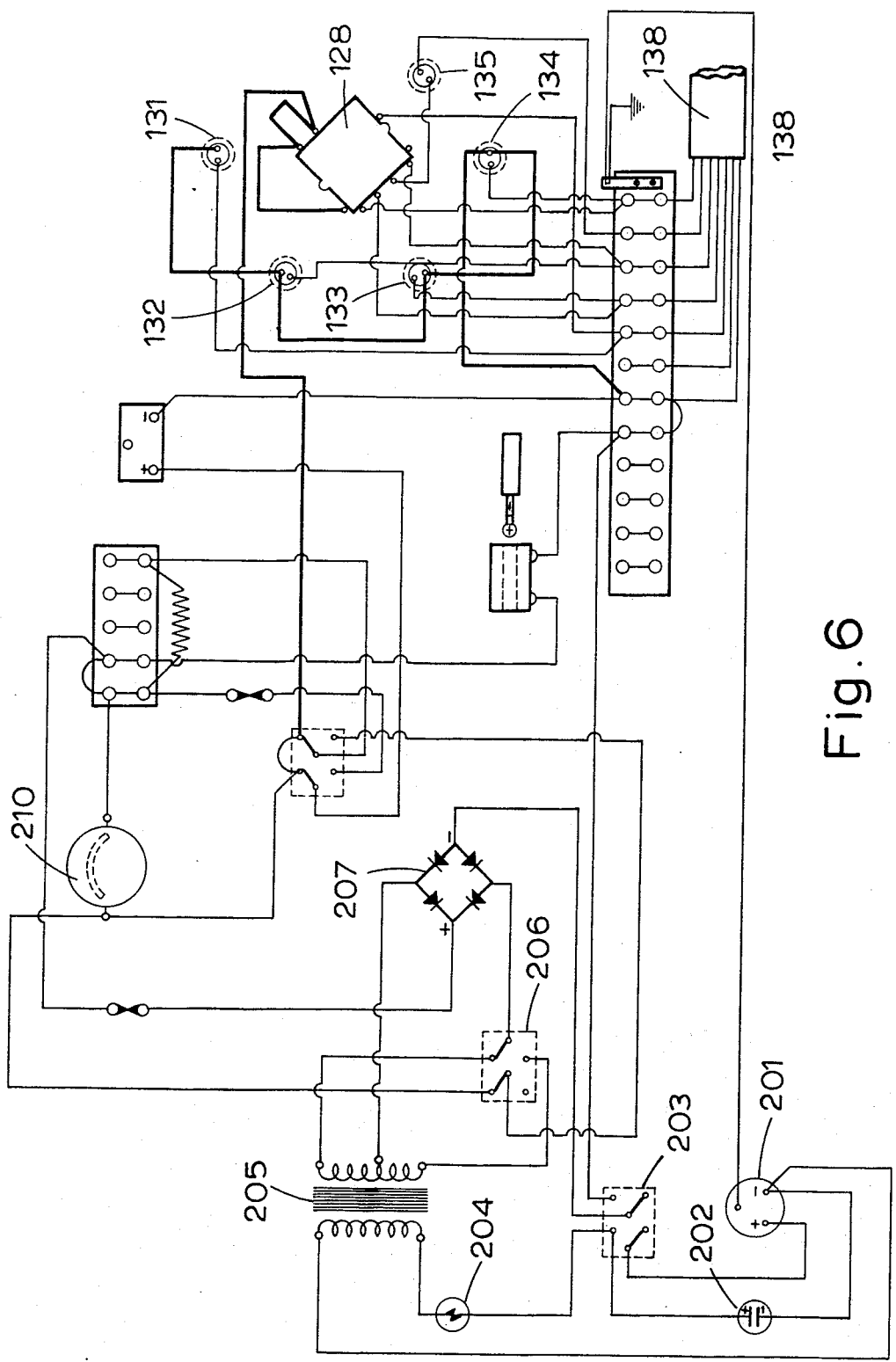
FIG. 6 is a circuit diagram of the electrical part of the testing apparatus.

A schematic wiring diagram of the electrical part of the testing apparatus is shown in FIG. 6. In FIG. 6 reference numeral 201 indicates the main socket and 202 a neon on-off main indicator light. The main supply circuit includes an on-off switch 203, a voltage selector switch 206, a thermal protector switch 204, transformer 205 and a rectifier 207. The indicator lights 131 to 135 are connectable in turn with one of the circuits of the trailer through lead 137 by means of rotary switch 128 and with ammeter 210.

Reference has been made above to the usefulness of the testing apparatus in accordance with the invention for testing the triple line braking system of the trailer of an articulated vehicle. As previously indicated, the conventional triple line braking system consists of three lines or circuits termed the 'service line', 'auxiliary line' and 'emergency line'. The main braking effort is supplied by compressed air from a reservoir in the trailer. This reservoir is charged with air at a pressure of about 60 to 70 lbs per sq inch by a pipe from a compressor located in the tractor and this pipe is termed the 'emergency line'. Supply of air from the tractor reservoir to the brakes is controlled by a relay valve which is adjusted to divert air to the brakes if the air pressure in the emergency line falls below a predetermined pressure, usually about 40 p.s.i. Thus in the event of a leak or fracture in the emergency line, the emergency line relay valve should automatically connect the brakes with the trailer reservoir, causing automatic application of the brakes.

Normal application of the brakes (on the depression of the foot pedal) is achieved by applying a signal pressure to the service line, which also acts on the emergency relay valve and causes the trailer reservoir to be connected to the brakes resulting in their application. Exhaustion of air from the service line results in release of the brakes.

The auxiliary line provides a separate air supply to the trailer brakes and connects the brakes to a reservoir on the tractor when the hand brake is applied.

All three lines in the trailer are connected to the tractor by flexible rubber or plastic tubes and suitable standard connectors are provided so that the air system (and also the electrical system) of the tractor can be readily and quickly coupled to any trailer.

The testing apparatus in accordance with the invention enables the pneumatic and electrical systems of a trailer to be thoroughly tested without requiring the presence of the tractor.

The test procedure which may be adopted is as follows:

PNEUMATIC SYSTEM

The apparatus is coupled to the pneumatic system of the trailer using flexible hoses connected at one end to outlets 129, 130 and 140 and at the other to the trailer input hoses using standard connectors.

A. Emergency Line

This is checked using valve 123 which is operated to charge the trailer reservoir by moving its operating lever to the position shown in dotted lines in FIG. 3. Charging of the emergency line is continued until the correct working pressure (e.g. 65–75 p.s.i.) is reached as indicated on gauge 126. The lever of valve 123 is then moved to the off or hold position which is mid way between the dotted and full line positions shown in FIG. 3. Any pressure drops indicated on gauge 126 after a minute or so in this position will indicate a leak in the emergency system which should be located and rectified before proceeding further. Proper action of the relay emergency valve is checked by moving the lever of valve 123 to the exhaust (full line position) and noting the pressure at which the release valve is heard to operate and the brakes are seen to come on. This should be about 30 to 40 p.s.i. Valve 123 is then operated to recharge the line and the emergency valve should be heard to operate in the opposite direction and the brakes seen to release at about 45 p.s.i. For the check of the service and auxiliary lines, the emergency line is recharged to normal working pressure.

B. Service Line

The switch to toggle valve 127 is directed to the service line position (upward position in FIG. 3) and the line is charged gradually in stages to maximum pressure by moving the lever of valve 122 to the dotted on-position and returning the levers of both valves 122 and 123 to the mid point hold-position at each stage to check the behaviour of the pressure gauges 126 and 126'. If either pressure gauge shows a pressure drop during these stage checks, the brake chambers and air lines feeding them are checked for leaks. The service line is then exhausted rapidly and the action of the emergency relay valve as it exhausts is noted. Slow exhausting suggests sluggish movement of brake actuating mechanism or excessive travel indicating a requirement for checking the condition of brake actuation or adjustment.

C. Auxiliary Line

Toggle valve 127 is switched to the opposite position and the auxiliary line charged by moving the lever of valve 122 to the dotted position shown in FIG. 3. Again the charging is carried out in stages of increasing pressure, returning the lever to the hold position at each stage and checking for leaks by observing the pressure gauge 126'. During exhausting, slow reduction in pressure indicates sluggish movement of the rapid exhaust valve of the trailer which should be checked.

ELECTRICAL SYSTEM

The condition of the electrical circuits can be readily checked by rotating switch 128 and noting that the respective indicator 131 to 135 is lit. In a refined version of the electrical testing part of the apparatus an ammeter is wired in series with the switch 128 and is calibrated in numbers of 21–24 watt and 5 to 6 watt bulbs, which are the normal size bulbs used in trucks. Since the operator will know the number and type of bulbs in each circuit he will appreciate that a low reading will indicate, a defective bulb or a poor electrical connection in the circuit.

The testing apparatus in accordance with the invention enables an operator single-handed to check the entire braking and electrical system of a vehicle trailer without requiring the presence of a mating tractor which is a great practical advantage and improvement over conventional testing procedures. Although the apparatus may be connected to a main electrical supply and a conventional garage compressed air line, the apparatus can be entirely portable by using a compressed air or nitrogen bottle as the source of pressurized gas and a 12 or 24 volt accumulator as the electrical source.

What is claimed is:

1. A manually-operated control valve including manual operating means for controlling the supply and exhaust of a working fluid to and from a fluid operable system which comprises a housing having an inlet for the working fluid and an outlet for delivering working fluid to the system, a pressure-regulating valve disposed between said inlet and said outlet and an exhaust valve for exhausting fluid from the system, said regulating valve and said exhaust valve each including actuating means comprising plungers which are operable by a single manual operating means.

2. A control valve according to claim 1 wherein said manual operating means includes a cam surface which actuates the plunger of the regulating valve when the manual operating means is moved in one direction and actuates the plunger of the exhaust valve when the manual operating means is moved in the opposite direction.

3. A control valve according to claim 2 wherein the housing also includes a non-return valve disposed between the inlet and the outlet and arranged to prevent flow of working fluid in the reverse direction through the pressure regulating valve.

4. Apparatus for testing vehicle pneumatic braking systems which comprises a conduit for connection to a pressurized gas source, a manually-operated control valve for controlling the supply and exhaust of gas to and from the vehicle and a pressure gauge connected to the control valve for indicating pressure of gas supplied to the vehicle braking system, said control valve including manual operating means comprising a housing having an inlet adapted for connection to the pressurised gas source and an outlet for delivering pressurised gas to the vehicle via the pressure gauge, a pressure-regulating valve disposed between said inlet and outlet and an exhaust valve for exhausting pressurised gas from the system, said regulating valve and said exhaust valve each including actuating means comprising plungers which are operable by a single manual operating means.

5. Apparatus according to claim 4 wherein said manual operating means includes a cam surface which actuates the plunger of the regulating valve when the manual operating means is moved in one direction and actuates the plunger of the exhaust valve when the manual operating means is moved in the opposite direction.

6. Apparatus according to claim 5 for testing the pneumatic braking system of a vehicle of the kind having a plurality of air circuits for operating the brakes, said apparatus comprising a casing which includes a plurality of said manually-operable control valves, each control valve having its own associated pressure gauge and means for separate connection to one of the air circuits.

7. Apparatus according to claim 6 wherein the casing includes electrical testing means for selectively testing the electrical circuits of a vehicle, said electrical testing means including a lead for connection to the vehicle electrical circuits, a circuit condition indicator mounted in the casing, an electrical power source and a rotary switch for selectively connecting each circuit with the power source and the indicator.

8. Apparatus according to claim 5 for testing the pneumatic braking system of a trailer of the kind having triple air operating circuits, namely service, auxiliary and emergency circuits, supplied to the trailer by separate pipes from a tractor, said apparatus comprising a casing housing a first said manually-operable control valve having an associated pressure gauge and means for connection to the trailer emergency circuit and a second said manually-operable control valve having an associated pressure gauge and means for selective connection to the auxiliary or service circuit and means for connecting both said control valves to a source of pressurised gas.

9. Apparatus according to claim 8 wherein the means for selectively connecting the second control valve to the auxiliary or service circuit is a toggle valve.

* * * * *